(12) United States Patent
Bede et al.

(10) Patent No.: US 12,187,095 B2
(45) Date of Patent: Jan. 7, 2025

(54) EXTERNAL ROTOR CUP FOR A FAN MOTOR OF A MOTOR VEHICLE

(71) Applicant: Valeo Systemes Thermiques, Le Mesnil-Saint-Denis (FR)

(72) Inventors: Sophie Bede, Le Mesnil-Saint-Denis (FR); Maurad Berkouk, Le Mesnil-Saint-Denis (FR); Laurent Legot, Le Mesnil-Saint-Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 211 days.

(21) Appl. No.: 17/786,866

(22) PCT Filed: Dec. 7, 2020

(86) PCT No.: PCT/FR2020/052294
§ 371 (c)(1),
(2) Date: Jun. 17, 2022

(87) PCT Pub. No.: WO2021/123548
PCT Pub. Date: Jun. 24, 2021

(65) Prior Publication Data
US 2023/0023583 A1 Jan. 26, 2023

(30) Foreign Application Priority Data
Dec. 18, 2019 (FR) .................................. 1914932

(51) Int. Cl.
*F04D 25/06* (2006.01)
*B60H 1/00* (2006.01)
(Continued)

(52) U.S. Cl.
CPC ......... *B60H 1/00471* (2013.01); *F04D 25/06* (2013.01); *F04D 25/082* (2013.01); *F04D 29/4226* (2013.01)

(58) Field of Classification Search
CPC ............... F04D 29/403; F04D 29/4206; F04D 29/4226; F04D 29/281–283;
(Continued)

(56) References Cited

U.S. PATENT DOCUMENTS

| 10,491,060 | B2 * | 11/2019 | Wang ..................... H02K 21/22 |
| 2011/0229358 | A1 * | 9/2011 | Streng ................... F04D 25/082 |
| | | | 417/423.14 |

(Continued)

FOREIGN PATENT DOCUMENTS

| EP | 1548171 A2 | 6/2005 |
| EP | 3203608 A1 | 8/2017 |
| JP | S56164689 U | 12/1981 |

OTHER PUBLICATIONS

International Search Report and Written Opinion in corresponding International Application No. PCT/FR2020/052294, mailed Apr. 12, 2021 (15 pages).

*Primary Examiner* — Thomas Fink
(74) *Attorney, Agent, or Firm* — Osha Bergman Watanabe & Burton LLP

(57) ABSTRACT

A cup (28) of a external rotor with symmetry of revolution about the axis comprises: a first cylindrical portion (68) which is radially internal, a second cylindrical portion (32) which is radially external and a third portion (70) between the two cylindrical portions (32, 68). When viewed in cross-section, the third portion (70) extends between two points (P1, P2) which define a straight line which forms, with the axis of the rotor cup (28), an angle (a) of between 65° and 80°. The ratio between the distance (R-P1, R-p2) between the first point (P1, P2) which is radially internal or radially external, respectively, and the axis of symmetry of the rotor cup (28), on the one hand, and the radius (R32) of
(Continued)

the second cylindrical portion (32), on the other hand, is between 0.04 and 0.32 or between 0.65 and 1.0, respectively.

12 Claims, 11 Drawing Sheets

(51) Int. Cl.
    *F04D 25/08*     (2006.01)
    *F04D 29/42*     (2006.01)

(58) Field of Classification Search
    CPC ...... F04D 25/082; F04D 25/064; F04D 25/08; F04D 25/0613
    See application file for complete search history.

(56) References Cited

U.S. PATENT DOCUMENTS

| | | | |
|---|---|---|---|
| 2017/0248147 A1* | 8/2017 | Ueda | F04D 17/16 |
| 2018/0131252 A1* | 5/2018 | Wanezaki | F04D 29/053 |
| 2018/0156238 A1* | 6/2018 | Fukuzawa | F04D 29/4226 |

* cited by examiner

EXTERNAL ROTOR CUP FOR A FAN MOTOR OF A MOTOR VEHICLE

TECHNICAL FIELD

The present description relates to an outer rotor cup for a fan motor of a motor vehicle heating, ventilation and/or air conditioning installation. The present description likewise relates to a motor comprising such a cup and to a fan comprising such a motor.

PRIOR ART

Motor vehicles are commonly equipped with a heating, ventilation and/or air conditioning installation able to generate an air flow. Such an installation is also able to manage the temperature and distribution within the vehicle interior of the air flow created. Such a heating, ventilation and/or air conditioning device has, inter alia, a fan comprising a fan impeller rotationally driven by an electric motor. The electric motor is notably an electronically switched electric motor controlled by a power supply module.

An electronically switched electric motor, or brushless direct current motor, has a rotor and stator assembly, each of these components bearing electromagnetic elements whose interaction generates the movement of the rotor in relation to the stator and, ultimately, the movement of the fan impeller.

The electric motor conventionally comprises an external rotor, an internal stator, fixed to a support for the electric motor. The external rotor comprises in particular a metal cup (or yoke), with a cylindrical outer edge inside which magnets are fixed, so as to surround the winding of the rotor. The cup conventionally has a radially internal cylindrical portion accommodating the output shaft of the rotor. Between the radially internal cylindrical portion and the radially external cylindrical portion, the cup conventionally forms an overall planar portion.

In order to reduce the weight of the fan, it has been suggested to reduce the thickness of the cup. However, it has been found that reducing the thickness of the cup tends to reduce the frequency of the first natural mode of the cup, such that this first natural mode causes a loud noise, which is not acceptable, in the motor vehicle, in certain cases of using the fan.

An object of the present description is to propose such a rotor cup that does not have at least some of the aforementioned drawbacks.

SUMMARY OF THE INVENTION

To that end, what is described is a rotor cup for a motor with an external rotor, in particular for a motor-fan unit intended to equip a heating, ventilation or air conditioning installation of a motor vehicle, the rotor cup exhibiting symmetry of revolution about an axis of symmetry, the rotor cup comprising:
a first, radially inner cylindrical portion,
a second, radially outer cylindrical portion, and,
between the first cylindrical portion and the second cylindrical portion, at least a third portion such that, as seen in cross section, the third portion extends between a first, radially inner point and a second, radially outer point, the straight line connecting the first and second points forming an angle of between 65° and 80° with the axis of symmetry of the rotor cup, the ratio between the distance between the first point and the axis of symmetry of the rotor cup, on the one hand, and the radius of the second cylindrical portion, on the other hand, being between 0.04 and 0.32, the ratio between the distance between the second point and the axis of symmetry of the rotor cup, on the one hand, and the radius of the second cylindrical portion, on the other hand, being between 0.65 and 1.0.

In this way, the rotor cup advantageously has a major portion of frustoconical overall shape, thereby improving the stiffness of the rotor cup. However, the apex angle of the frustoconical portion is chosen so as to limit the axial bulk of the rotor cup.

The rotor cup preferably has one or more of the following features, taken individually or in combination:
the rotor cup comprises a fourth, annular portion between the first portion and the third portion, substantially normal to the axis of symmetry of the rotor cup, the ratio between the inner radius of the fourth portion and the radius of the second cylindrical portion preferably being between 0.05 and 0.24 and/or the ratio between the outer radius of the fourth portion and the radius of the second cylindrical portion preferably being between 0.15 and 0.30;
the fourth portion forms a recess with respect to the third portion;
the third portion is frustoconical or flared;
the third portion has openings separated by arms, the rotor cup preferably comprising a prime number of arms, greater than or equal to seven;
the openings are trapezoidal or in the form of an ogive;
the arms are in the form of a "Y";
the rotor cup is made from metal, the rotor cup preferably having a thickness less than or equal to 3 mm, more preferably less than or equal to 2 mm, even more preferably a thickness equal to 1.6 mm;
the rotor cup comprises, as seen in section, a bend between the first portion, on one side, and the third portion or the fourth portion, where appropriate, on the other side, the thickness of the bend being greater than the thickness of the first portion, the ratio between the thickness of the bend and the thickness of the first portion preferably being greater than or equal to 1.3 and/or less than or equal to 1.6;
the first cylindrical portion extends over a height, measured in the direction of the axis of symmetry of the cup, such that the ratio between the height of the first cylindrical portion and the diameter of the first cylindrical portion is between 0.80 and 0.98; and
the second cylindrical portion extends over a height, measured in the direction of the axis of symmetry of the cup, the ratio between the height of the second cylindrical portion and the radius of the second cylindrical portion being between 0.30 and 0.60.

According to another aspect, what is described is a motor with an outer rotor for a motor vehicle heating, ventilation or air conditioning installation, comprising a stator with a winding, a rotor comprising a rotor cup as described above, in all its combinations, magnets being fixed on the second cylindrical portion of the rotor cup, the magnets being arranged radially on the outside with respect to the winding of the stator.

According to yet another aspect, what is described is a fan for a motor vehicle heating, ventilation or air conditioning installation, comprising a motor as described above, in all its combinations, a shaft secured to the rotor cup, and a fan impeller fixed to the shaft so as to be driven in rotation.

BRIEF DESCRIPTION OF THE DRAWINGS

Other features, details and advantages of the invention will become apparent upon reading the detailed description below, and upon analyzing the appended drawings, in which.

DESCRIPTION OF EMBODIMENTS

In the remainder of the description, elements that are identical or perform identical functions have been designated with the same reference sign. In the present description, for the sake of conciseness, these elements are not described in detail in each embodiment. Rather, only the differences between the variant embodiments are described in detail.

Figure 1:
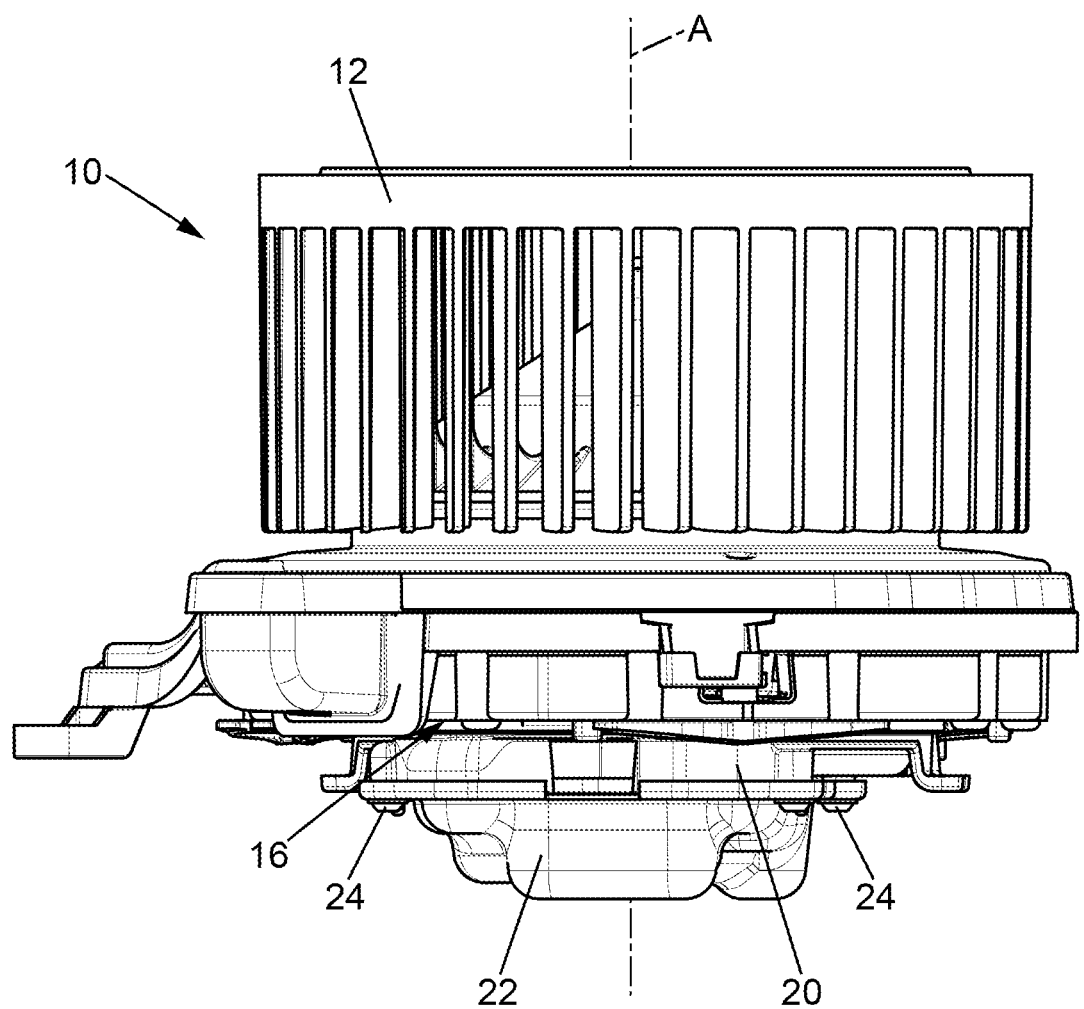
FIG. 1 is a schematic perspective representation of a fan device.
Figure 2:
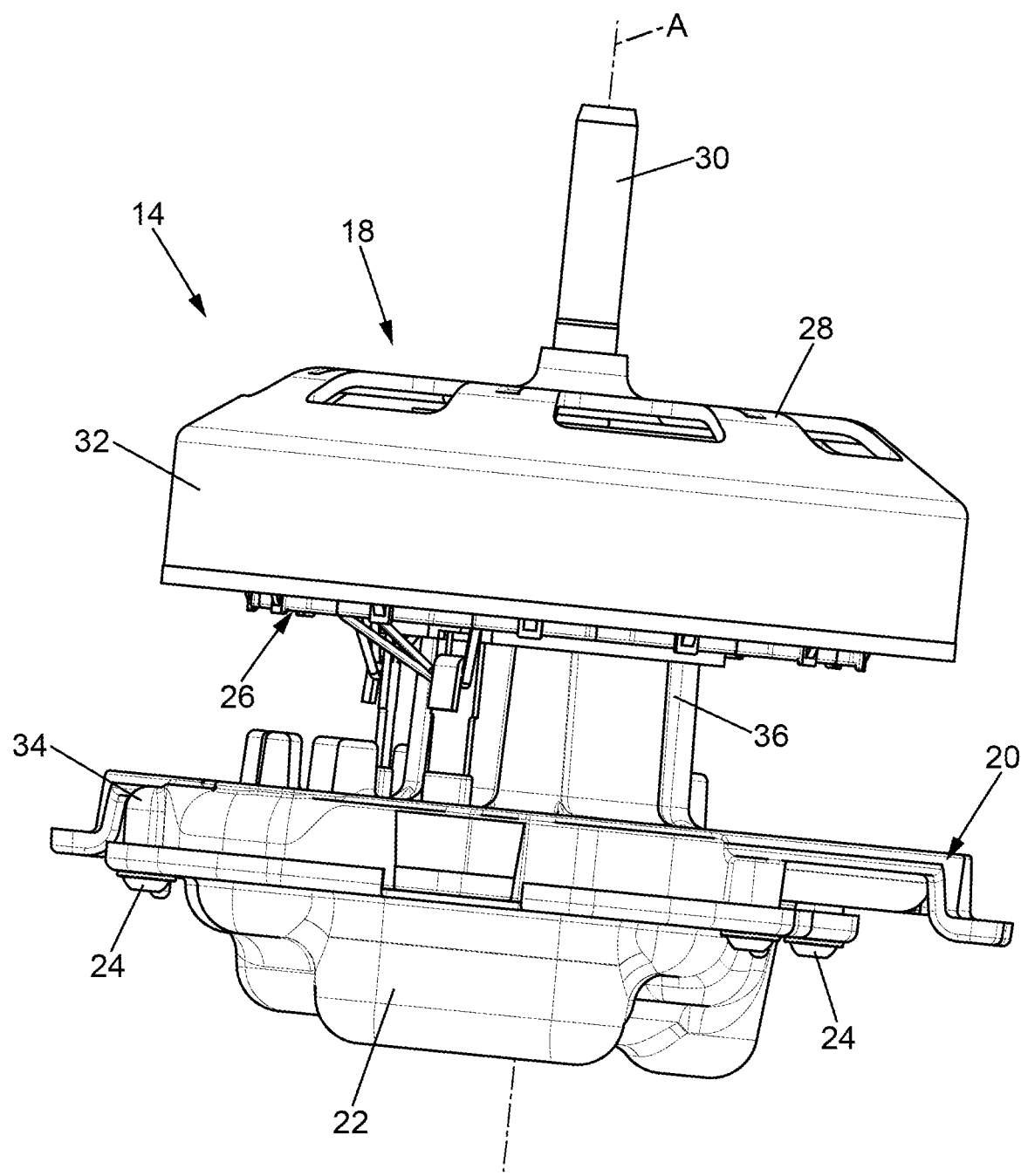
FIG. 2 is a schematic perspective view of an example of a motor which can be implemented in the fan device of FIG. 1.
Figure 3:
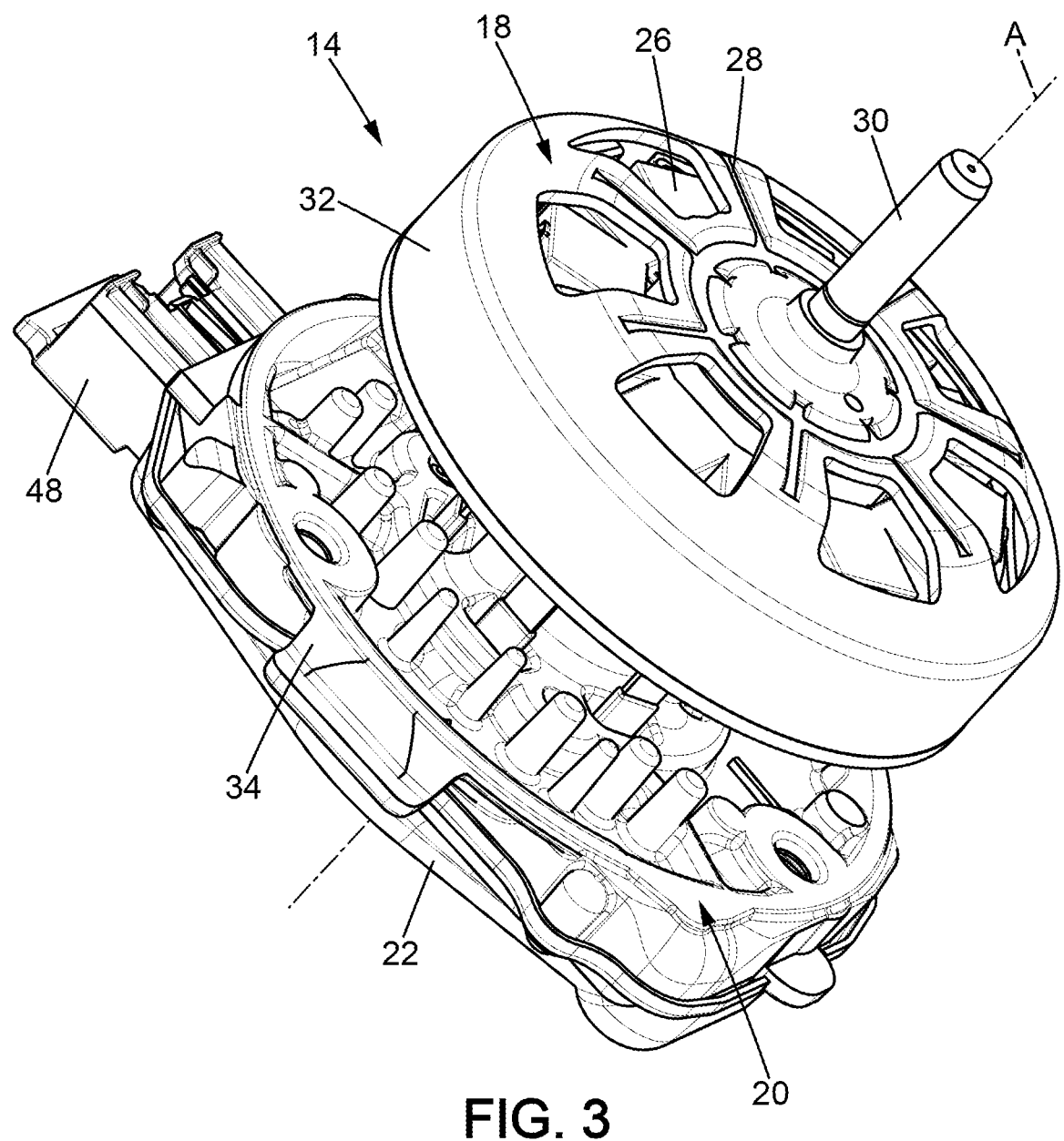
FIG. 3 is a schematic view, from a different perspective, of the example of the motor of FIG. 2.
Figure 4:
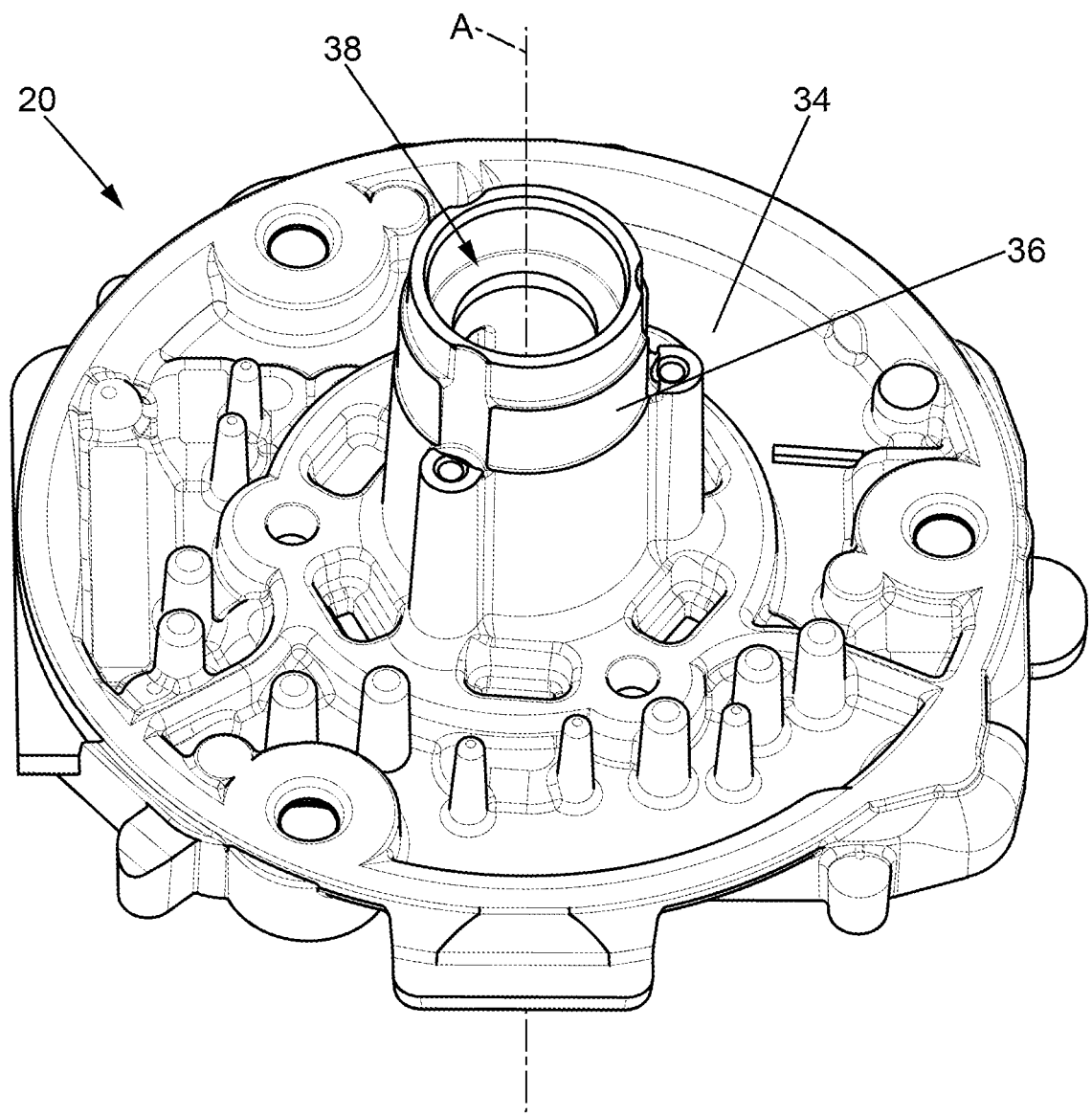
FIG. 4 is a perspective view of a rotor support implemented in the motor of FIGS. 2 and 3.

FIG. 1 illustrates a fan device 10 for a vehicle ventilation installation.

The fan device 10 essentially comprises, as shown, a fan impeller 12, an electric motor 14, and a support 16 for the electric motor 14. The fan impeller 12 rotates about an axis of rotation A. The electric motor 14 is intended to drive in rotation, about its axis A, the fan impeller 12. The support 16 for the motor 14 is intended to allow the fixing of the fan device 10 in a motor vehicle, by limiting the transmission of the vibrations generated by the electric motor 14 and/or the fan impeller 12 in the motor vehicle and/or external stresses toward the electric motor 14 and/or the fan impeller 12. The support 16 for the motor 14 may in particular have two coaxial rings, of axis A of rotation of the fan impeller 12, interconnected by elastomer material. In particular, the elastomer material can form a decoupling ring between the inner ring and the outer ring. The inner ring may be intended to be fixed to the motor 14. The outer ring may be intended to be fixed to a structural element, in particular of a vehicle ventilation installation. The elastomer material is for example polystyrene-b-poly(ethylene-butylene)-b-polystyrene or SEBS.

The electric motor 14 here forms a mechanical assembly comprising a rotating element 18, in this case the rotor 18 of the motor 14, a support 20 for the rotor 18, and a cover 22, fixed on the support 20 for the rotor 18. Here, the cover 22 is fixed on the support 20 for the rotor 18 by means of screws 24. Of course, other fixing means can be implemented to fix the cover 22 on the support 20 for the rotor 18.

In this instance, the rotor 18 is an external rotor. Thus, the stator 26 associated with the rotor 18 is arranged radially inside the rotor 18. More specifically, the magnets 27 of the rotor 18 are radially on the outside with respect to the winding of the stator 26.

The rotor 18 has the shape of a perforated cup 28, fixed to a shaft 30. Here, the fan impeller 12 is fixed directly on the shaft 30. In this instance, the magnets 27 of the rotor 18 are fixed on the internal face of the cup 28, on a cylindrical strip 32 formed by the cup 28.

The support 20 is for example made of an aluminum alloy or a plastics material filled with metal particles.

Here, the support 20 for the rotor 18 has a base 34. In this instance, the base 34 extends wholly in a plane normal to the axis A of rotation of the motor 14. A substantially cylindrical relief 36 extends from the base 34. Here, the relief 36 extends substantially in the direction of the axis A of rotation of the motor 14. The relief 36 is hollow. The relief 36 may in particular form one or two housings 38 each accommodating a bearing ring, in particular a ball bearing, intended to guide the rotation of the shaft 30 with respect to the support 20. In particular, a first housing is formed at the free end of the relief 36 and a second housing is formed in the relief 36, substantially at the base 34. A ball bearing is accommodated in each of these housings.

Figure 5:
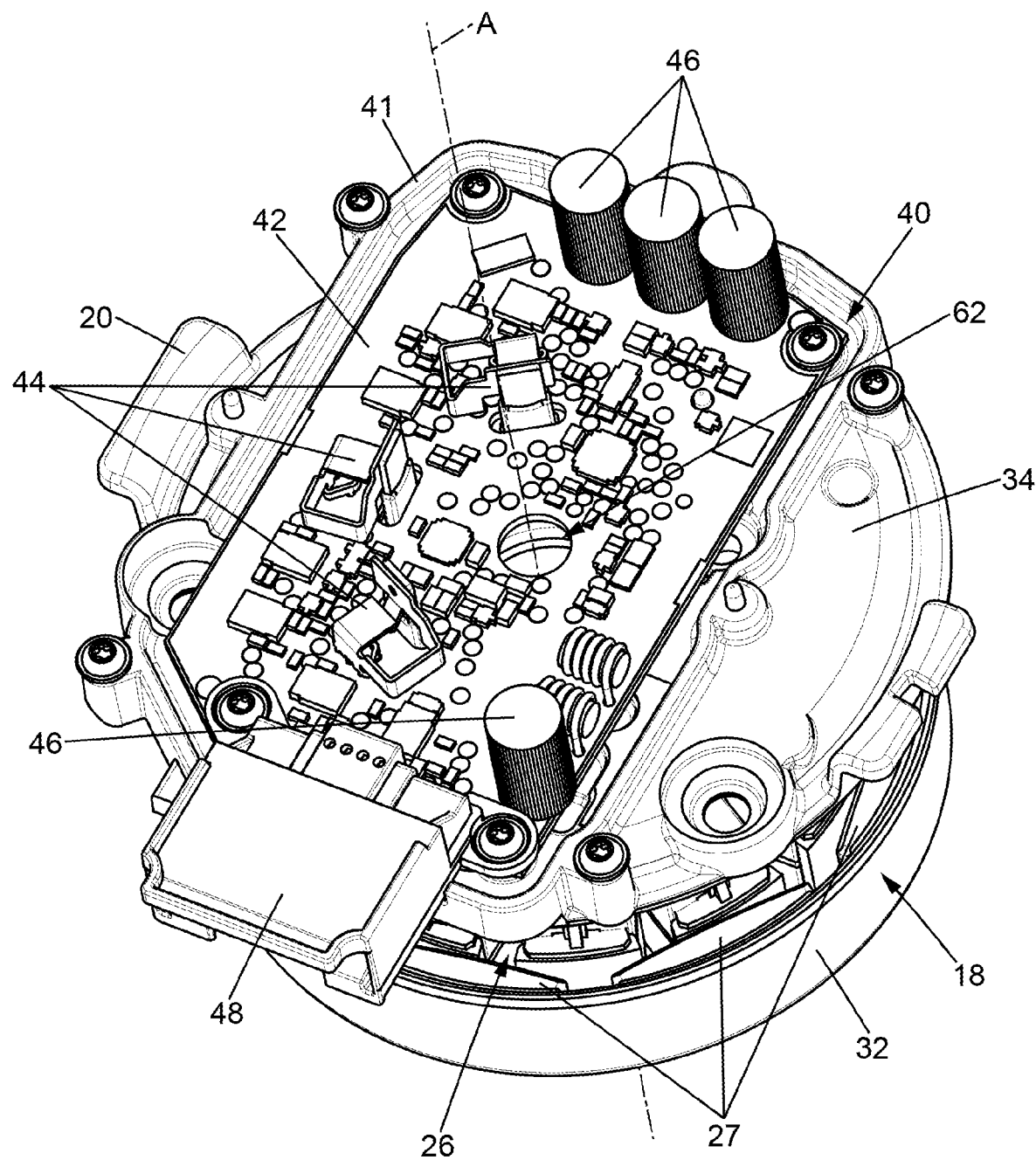
FIG. 5 is a bottom perspective view of the motor of FIGS. 2 and 3, in which the motor cover has been removed.

As can be seen more particularly in FIG. 5, the base 34 forms on its surface opposite to the cylindrical relief 36 a recess 40 accommodating a printed circuit board 42 (or electronic board) for controlling the motor 14. The recess 40 may be surrounded by a projecting rim 41. Various mechatronic components 44, 46 are fixed on the printed circuit board 42. In particular, mechanical devices 44 make it possible to connect lugs integral with the windings of the stator 26 to the printed circuit board 42. The power supply of these windings via these lugs can then allow the control of the electric motor 14. The bulkiest components 46, in particular the capacitors, may also be fixed on the printed circuit board 42, preferably near the edges of the printed circuit board 42.

A connector 48 is also connected to the printed circuit board 42. The connector 48 allows the supply of electric power to the printed circuit board 42 and, consequently, to the motor 14.

Lastly, the cover 22 is fixed on the base 34 of the support 20. In this instance, the cover 22 defines, with the recess 40 in the base 34, a housing for accommodating the printed circuit board 42. Here, the cover 22 comprises a substantially planar edge 50 extending in a plane normal to the axis A of rotation of the motor 14. The edge 50 has holes 51 allowing the fixing of the cover 22 on the base 34 of the support 20, by means of screws 24. The cover 22 also comprises a bottom 52, remote from the edge 50, in the direction of the axis A of rotation of the motor 14. The bottom 52 is in this instance substantially planar. The bottom 52 extends substantially in a plane normal to the axis A of rotation of the motor 14. The bottom 52 of the cover 22 is in this instance substantially parallel to the base 34 of the support 20. Here, the bottom 52 of the cover 22 is also substantially parallel to the printed circuit board 42.

The cover 22 is for example made of aluminum alloy or plastic filled with conductive particles, in particular plastic filled with metal particles.

It should be noted here that the cover 22 shown comprises peripheral bosses 54, 56. These bosses 54, 56 make it possible to accommodate the bulkiest electronic devices 46, in particular those which are tallest in the direction of the axis A of rotation of the motor 14.

Figure 6:
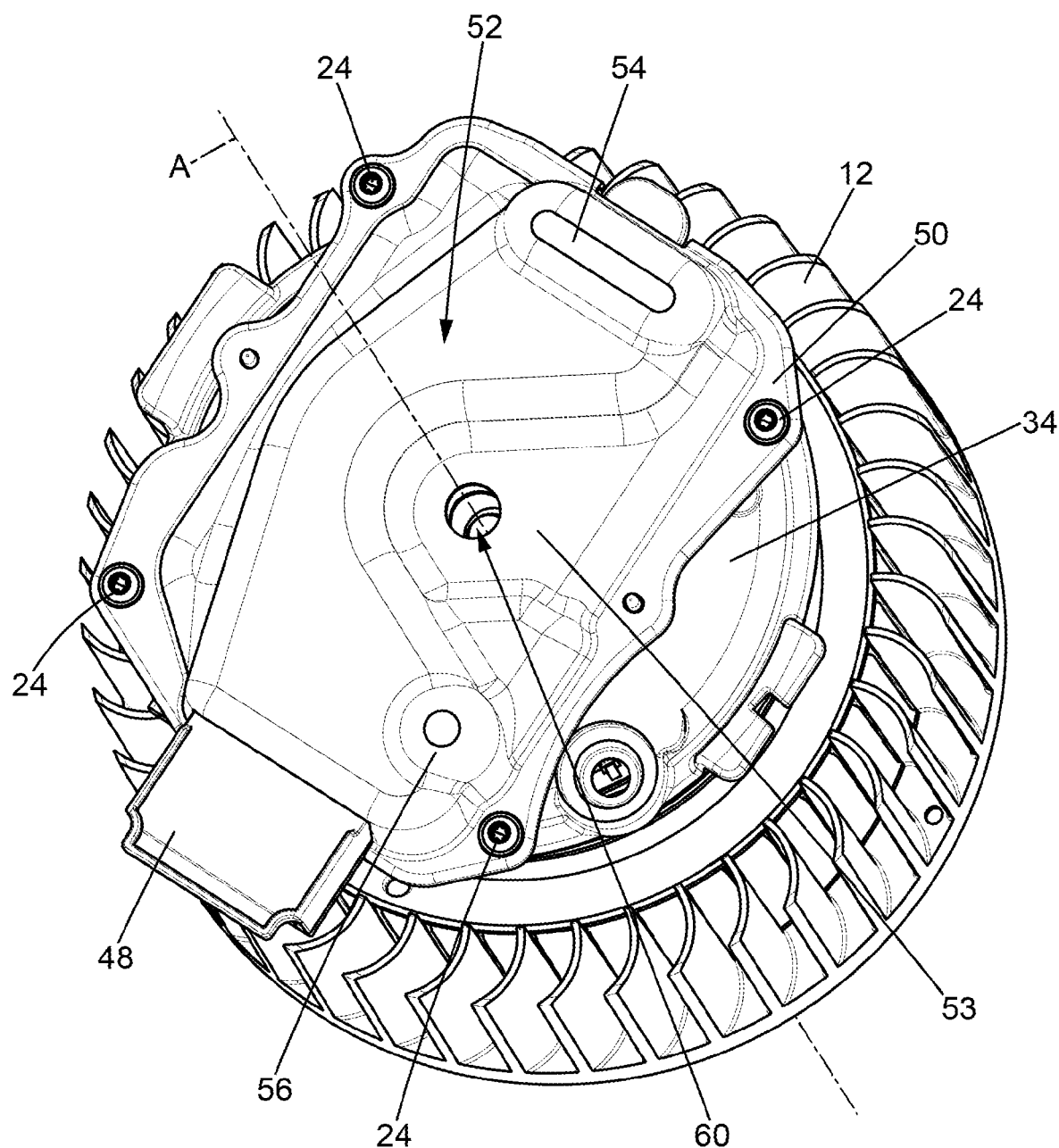
FIG. 6 is a bottom perspective view of the fan device of FIG. 1.
Figure 7:
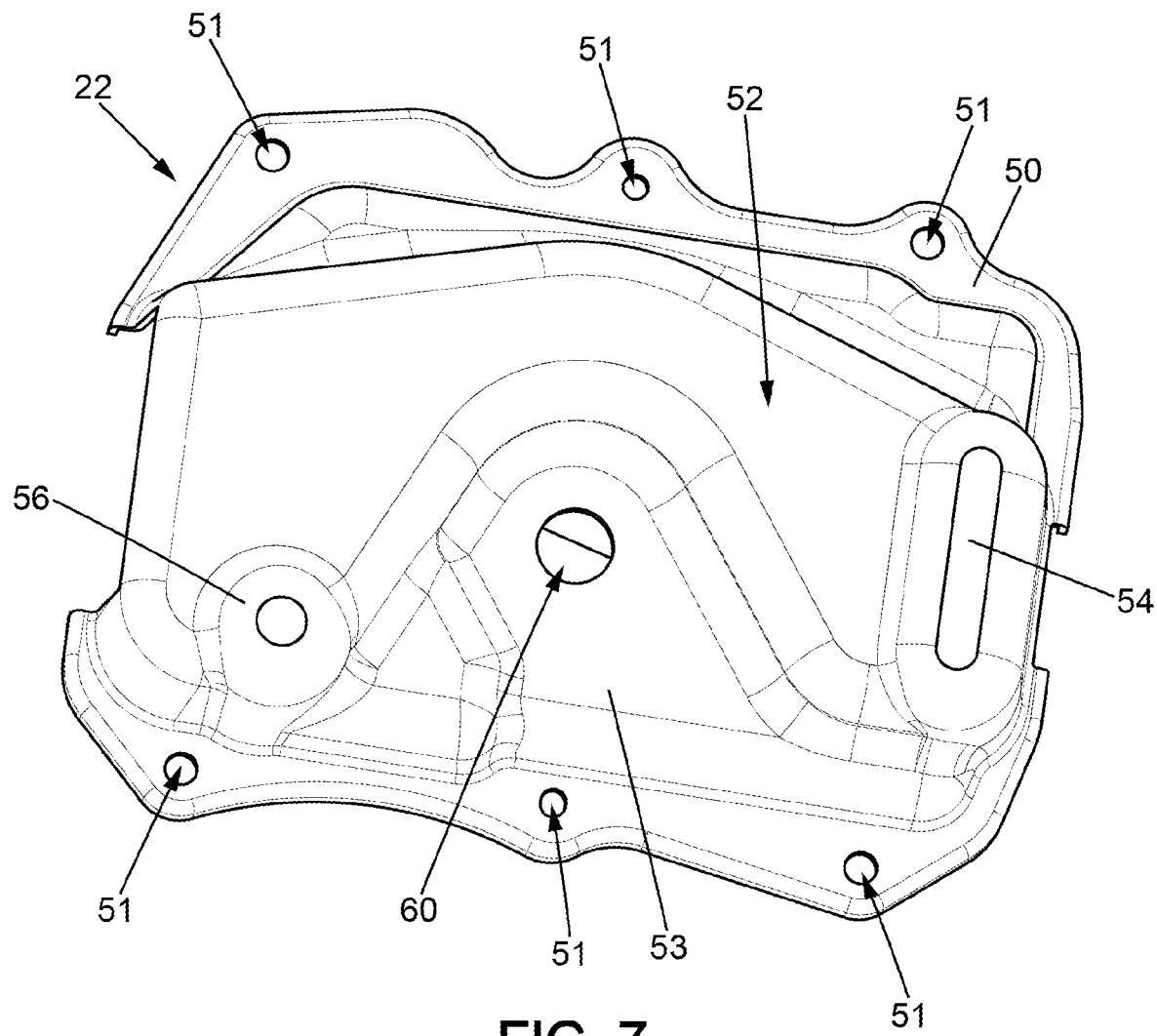
FIG. 7 schematically illustrates the external face of the motor cover of FIGS. 2 and 3.

In the example illustrated in FIGS. 6 and 7, in particular, the cover 22 also has a planar surface 53, closer to the edge 50 than the bottom 52, in the direction of the axis A of rotation of the motor 14.

Lastly, as can be seen in the figures, the cover 22 and the printed circuit board 42 may each have a through-opening 60, 62 facing the shaft 30 of the rotor 18. These openings 60, 62 can allow the passage of a counter-support for the shaft 30, allowing the impeller 12 to be fitted on the shaft 30. The opening 60 in the cover can then be closed, in particular by means of a sticker. This makes it possible to protect the printed circuit board 42 against the humidity of the ambient air.

In the following text, a more detailed description will be given of examples of a rotor cup 28 of a motor with an external rotor, which can be implemented in the motor 14 of the ventilation device 10 described above.

Figure 8:
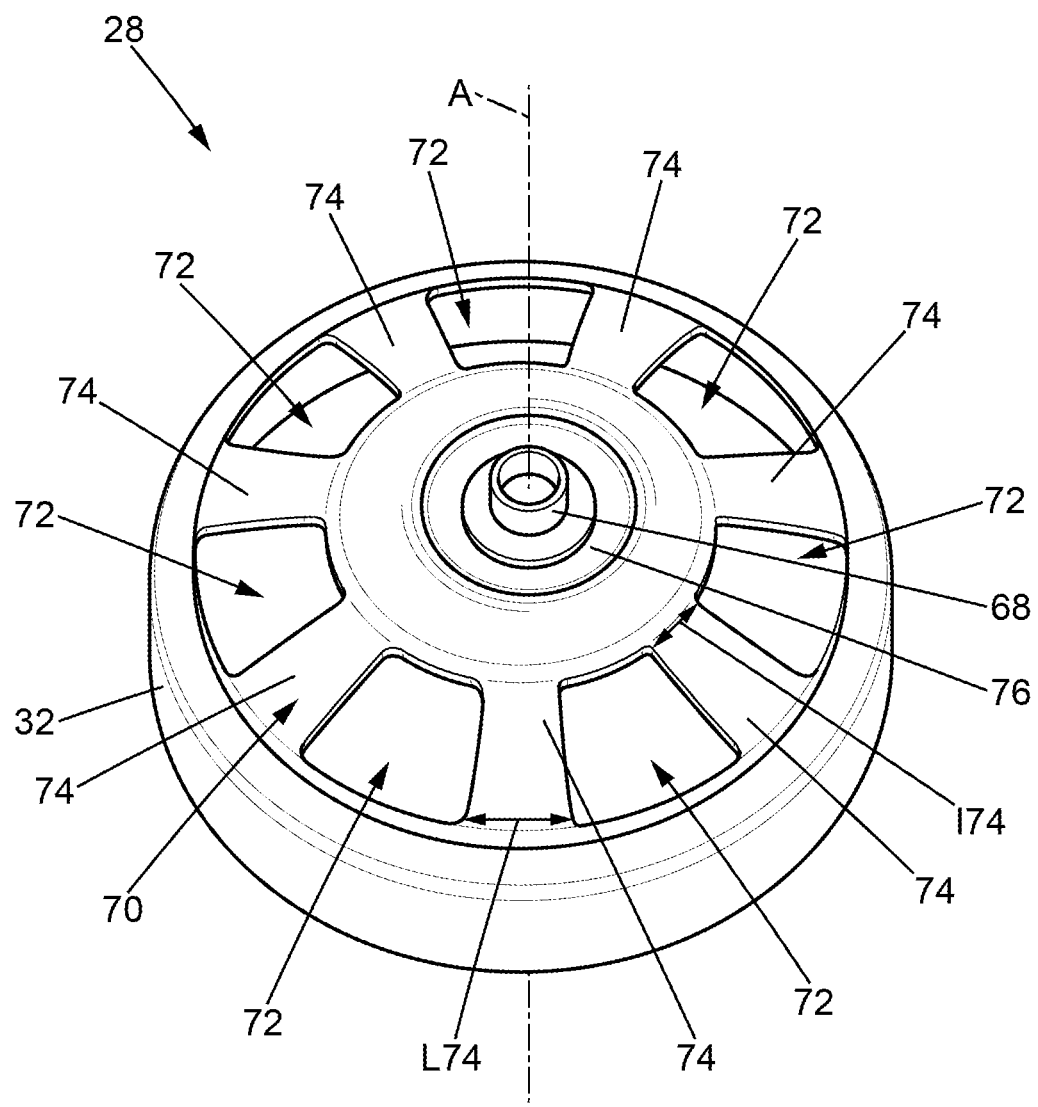
FIG. 8 is a schematic perspective representation of a first example of a rotor cup able to be implemented in the motor of FIGS. 2 and 3.
Figure 9:
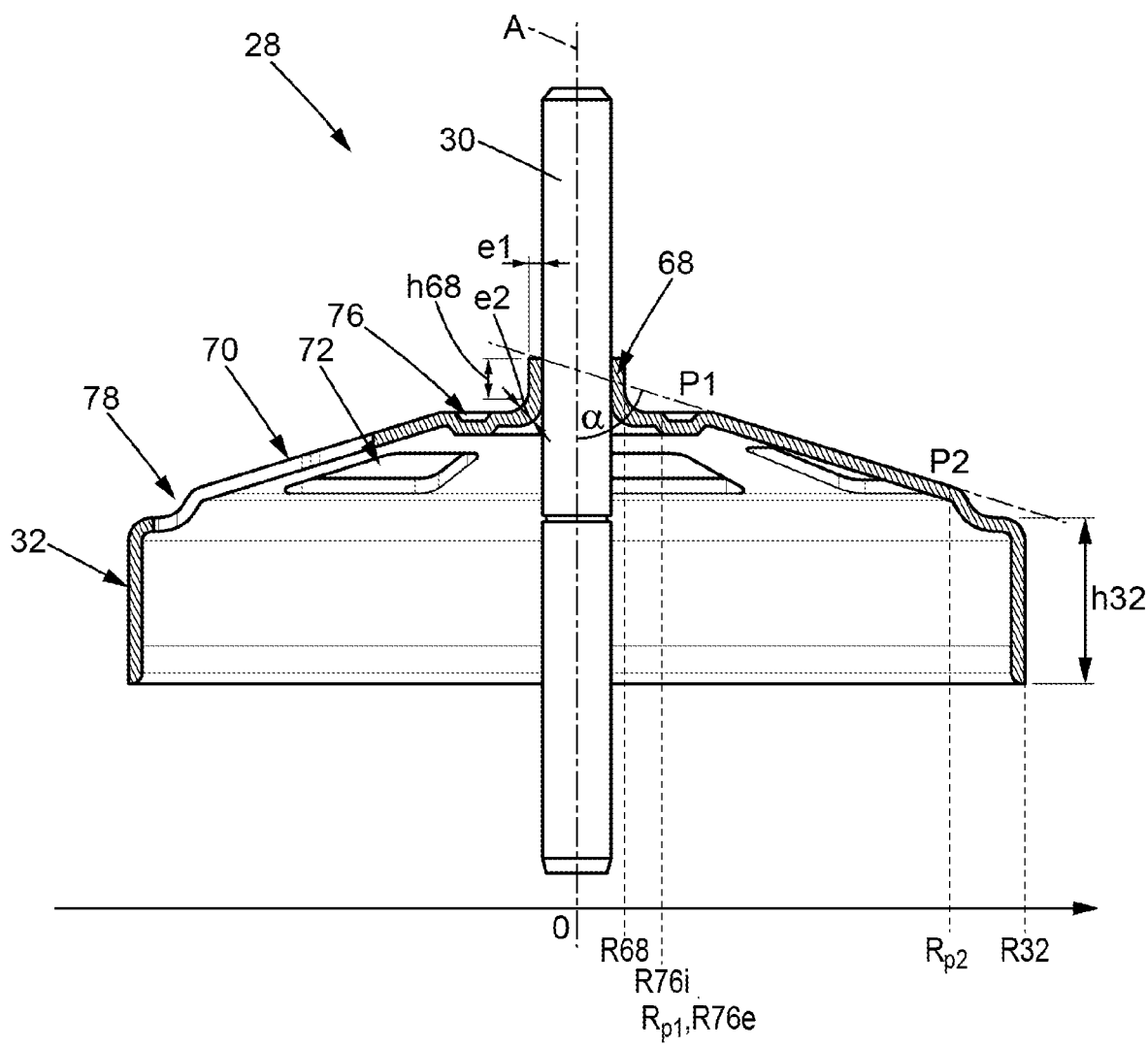
FIG. 9 is a schematic representation in section of the first example of the rotor cup of FIG. 8 fixed to the shaft of the rotor of the motor.

A first example of a cup 28 is illustrated in FIGS. 8 and 9.

As can be seen in these figures, the cup 28 exhibits symmetry of revolution, about an axis A of symmetry corresponding to the axis of rotation of the cup 28 and the motor 14.

The cup 28 essentially has a first, radially inner cylindrical portion 68 and a second, radially outer cylindrical portion 32. The second cylindrical portion 32 corresponds to the cylindrical strip 32 described above, on which the magnets 27 of the rotor 18 are fixed. The magnets 27 are fixed on the radially internal face of the second cylindrical portion 32.

The first cylindrical portion 68 extends over a height h68, measured in the direction of the axis A of symmetry of the cup 28. The height h68 of the first portion 68 may be such that the ratio between the height h68 of the first cylindrical portion 68 and the radius R32 of the second cylindrical portion 32 is between 0.8 and 0.98. Such a range is notably advantageous if the shaft 30 is force-fitted in the first portion 68. As an alternative, however, the shaft 30 may be fixed to the cup 28 by welding. In this case, the height h68 of the first portion can be considerably reduced, in particular close to 0. The first cylindrical portion 68 accommodates the shaft 30 of the motor 14. The shaft 30 is for example force-fitted in this first cylindrical portion 68. As an alternative or in addition, the shaft 30 may be welded to the first cylindrical portion 68.

Thus, since the shaft 30 is supported by two ball bearings, along the shaft 30 in the following order there are:
- the zone in which the shaft 30 is fitted in the first cylindrical portion 68—and more generally, the first cylindrical portion 68;
- a first ball bearing,
- the stator, separated from the shaft by the cylindrical relief 36 of the support 20 for the rotor 18, and
- a second ball bearing.

The second cylindrical portion 32 extends over a height h32, measured in the direction of the axis A of symmetry of the cup 28, such that the ratio between the height h32 of the second cylindrical portion 32 and the radius R32 of the second cylindrical portion 32 is between 0.30 and 0.60.

Between the first cylindrical portion 68 and the second cylindrical portion 32, the cup 28 has a third portion 70 such that, as seen in section, the third portion 70 extends between a first, radially inner point P1 and a second, radially outer point P2, the straight line connecting the first and second points P1, P2 forming an angle $\alpha$ of between 65° and 80° with the axis A of symmetry of the cup 28. In this way, the third portion 70 of the cup 28 has a frustoconical overall shape, thereby helping to stiffen the cup 28. However, the angle at the center of this third portion 70 is limited so as to limit the axial bulk of the cup 28. In this instance, the third portion 70 is frustoconical, the third portion 70 extending, in section, substantially along the straight line connecting the first and second points P1, P2.

In the example illustrated, the ratio between the distance $R_{P1}$ between the first point P1 and the axis A of symmetry of the cup 28, on the one hand, and the radius R32 of the second cylindrical portion 32, on the other hand, is between 0.04 and 0.32. Moreover, the ratio between the distance $R_{P2}$ between the second point P2 and the axis A of symmetry of the cup 28, on the one hand, and the radius R32 of the second cylindrical portion 32, on the other hand, is between 0.65 and 1.0. In this way, the third portion 70, of frustoconical overall shape, extends over most of the surface of the cup 28, ensuring the stiffness of this cup 28. It should be noted here that the radius R32 of the second portion 32 is the outer radius of the rotor cup 28.

In the example illustrated in FIGS. 8 and 9, the third portion 70 has openings 72 separated by arms 74. Here, the cup 28 comprises seven arms 74, separating seven openings 72. More generally, to limit the risks of natural modes of the cup 28 arising at relatively low frequencies, the cup 28 advantageously comprises a prime number of arms 74. This number of arms is preferably greater than or equal to seven. The openings 72 make it possible to further reduce the weight of the cup 28. The openings 72 likewise make it possible to facilitate the cooling of the windings of the stator accommodated inside the cup 28.

To maintain a satisfactory stiffness of the cup 28, the arms 74 may have a substantially trapezoidal shape. The arms 74 thus define openings 72 which are also trapezoidal. In this instance, each arm 74 has a minimum width I74, measured in an orthoradial direction with respect to the axis A of symmetry of the cup 28, such that the ratio of this minimum width I74 to the radius R32 of the second cylindrical portion 32 is between 0.08 and 0.30. Each arm 74 likewise has a maximum width L74, measured in an orthoradial direction with respect to the axis A of symmetry of the cup 28, such that the ratio of this maximum width L74 to the radius R32 of the second cylindrical portion 32 is between 0.08 and 0.45. Advantageously, the maximum width L74 of an arm 74 is measured at the radially outer end of the arm 74 in question, whereas the minimum width L74 is measured at the radially inner end of the arm 74 in question.

In the example of FIGS. 8 and 9, the cup 28 further comprises a fourth, annular portion 76. In this instance, the fourth portion 76 forms a recess with respect to the radially inner end of the third portion 70 and to the first cylindrical portion 68. The fourth portion 76 is located radially between the first portion 68 and the third portion 70. Here, the fourth portion 76 is normal to the axis A of symmetry of the cup 28. The ratio between the inner radius R76i of the fourth portion 76 and the radius R32 of the second portion 32 is for example between 0.05 and 0.24. As an alternative or in addition, the ratio between the outer radius R76e of the fourth portion 76 and the radius R32 of the second portion 32 is for example between 0.15 and 0.30. Thus, advantageously, this fourth, annular portion 76 has a reduced area. This fourth portion 76, forming a recess, makes it possible to further stiffen the cup 28. The fourth portion 76 is for example connected to the first cylindrical portion 68 by a bend. In this instance, the fourth portion 76 is adjacent to the third, frustoconical portion 70.

The cup 28 of FIGS. 8 and 9 further comprises a fifth, flared portion 78 between the second portion 32 and the third portion 70. More specifically, in section, the fifth portion 78 forms a bend. Here, the fifth portion 78 is adjacent to the third, frustoconical portion 70, on one side, and to the second cylindrical portion 32, on the other side. This fifth portion 78, forming a bend, also makes it possible to stiffen the cup 28.

Advantageously, the cup 28 is formed by the first, second, third, fourth and fifth portions 68, 32, 70, 76, 78 and, possibly, the bend connecting the first portion 68 to the fourth portion 76.

In this instance, the cup 28 is made from metal. The cup 28 preferably has a thickness less than or equal to 3 mm, further preferably less than or equal to 2 mm, more preferably a thickness equal to 1.6 mm. This limits the weight of the cup 28.

Between the first portion 68 and the fourth portion 76, the cup forms a bend here. The bend may have a thickness e2, which is greater than the thickness e1 of the first portion 68. The ratio between the thickness e2 and the thickness e1 may in particular be greater than or equal to 1.3 and/or less than or equal to 1.6. A thicker bend makes it possible to strengthen the cup 28. For example, the thickness e1 is equal to 1.8 mm. The maximum thickness e2 of the bend may be equal to 2.8 mm.

Figure 10:
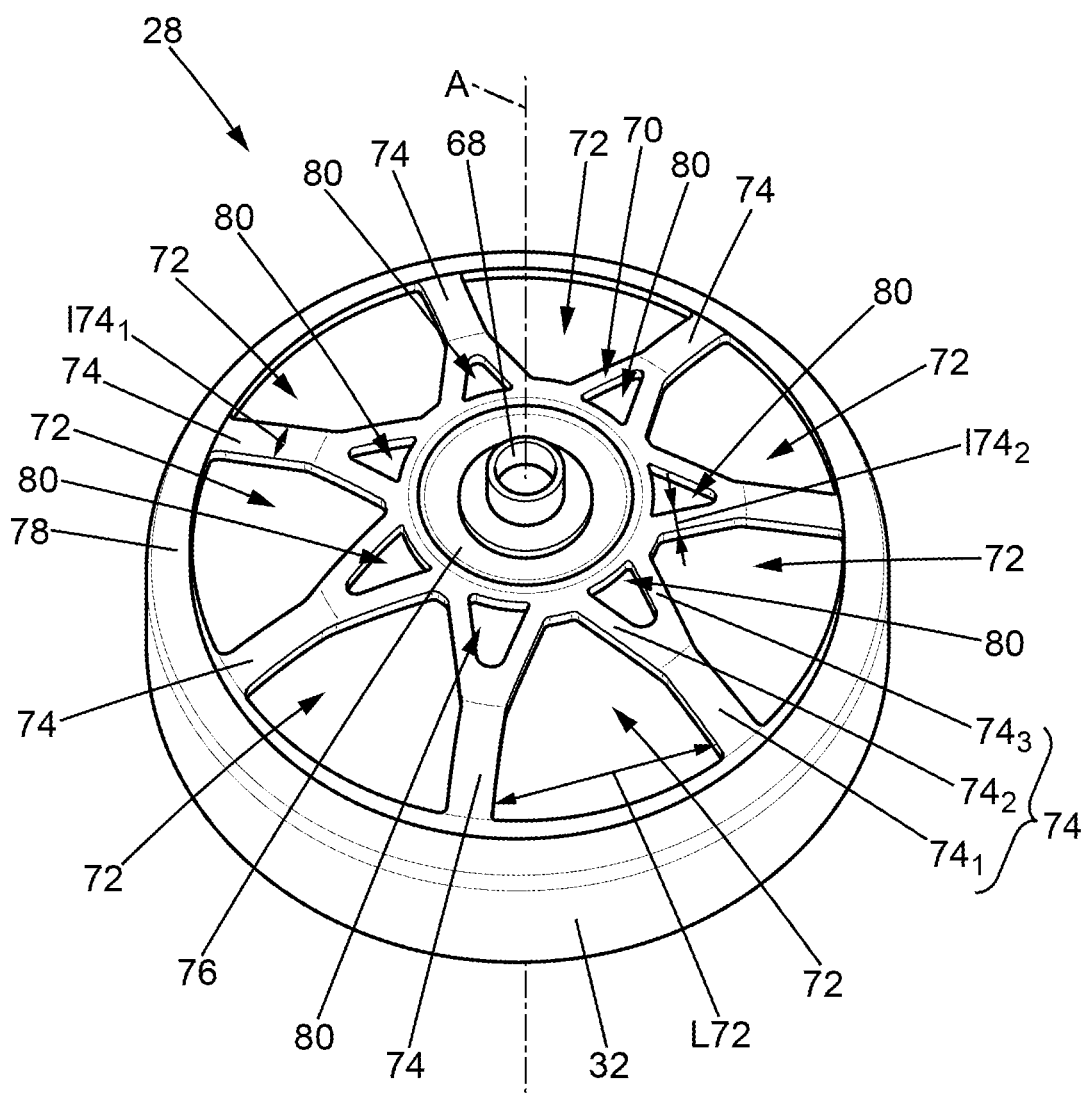
FIG. 10 is a schematic perspective representation of a variant of the first example of a rotor cup able to be implemented in the motor of FIGS. 2 and 3.

FIG. 10 illustrates a variant of the cup 28 of FIGS. 8 and 9. This variant differs from the cup 28 of FIGS. 8 and 9 first of all by the "Y" shape of the arms 74, comprising a stem $74_1$ dividing into two branches $74_2$, $74_3$, which are identical in this instance, in the vicinity of its radially internal end. In this instance, the stem of each arm 74 has a width $I74_1$, measured in an orthoradial direction with respect to the axis A of symmetry of the cup 28, such that the ratio of this width $I74_1$ to the radius R32 of the second cylindrical portion 32 is between 0.08 and 0.22. Each branch $74_2$, $74_3$ likewise has a width $I74_2$, measured in an orthoradial direction with respect to the axis A of symmetry of the cup 28, such that the ratio of this width $I74_2$ to the radius R32 of the second cylindrical portion 32 is between 0.04 and 0.12.

Due to the shape of the arms 74 in this variant, the openings 72 here are in the form of an ogive, with a rounded radially inner end. The width L72 of the openings 72, at their radially outer end, measured in an orthoradial direction, is such that the ratio between this width L72 and the radius R32 of the second cylindrical portion 32 is between 0.4 and 0.9.

In addition, the two branches $74_2$, $74_3$ of each arm 74 define a hole 80. Each hole 80 has a considerably reduced area in comparison with the openings 72. In this instance, the holes 80 are also in the form of an ogive, oriented in an opposite direction to the openings 72. In other words, here the rounded end of the holes 80 is oriented radially outward.

Figure 11:
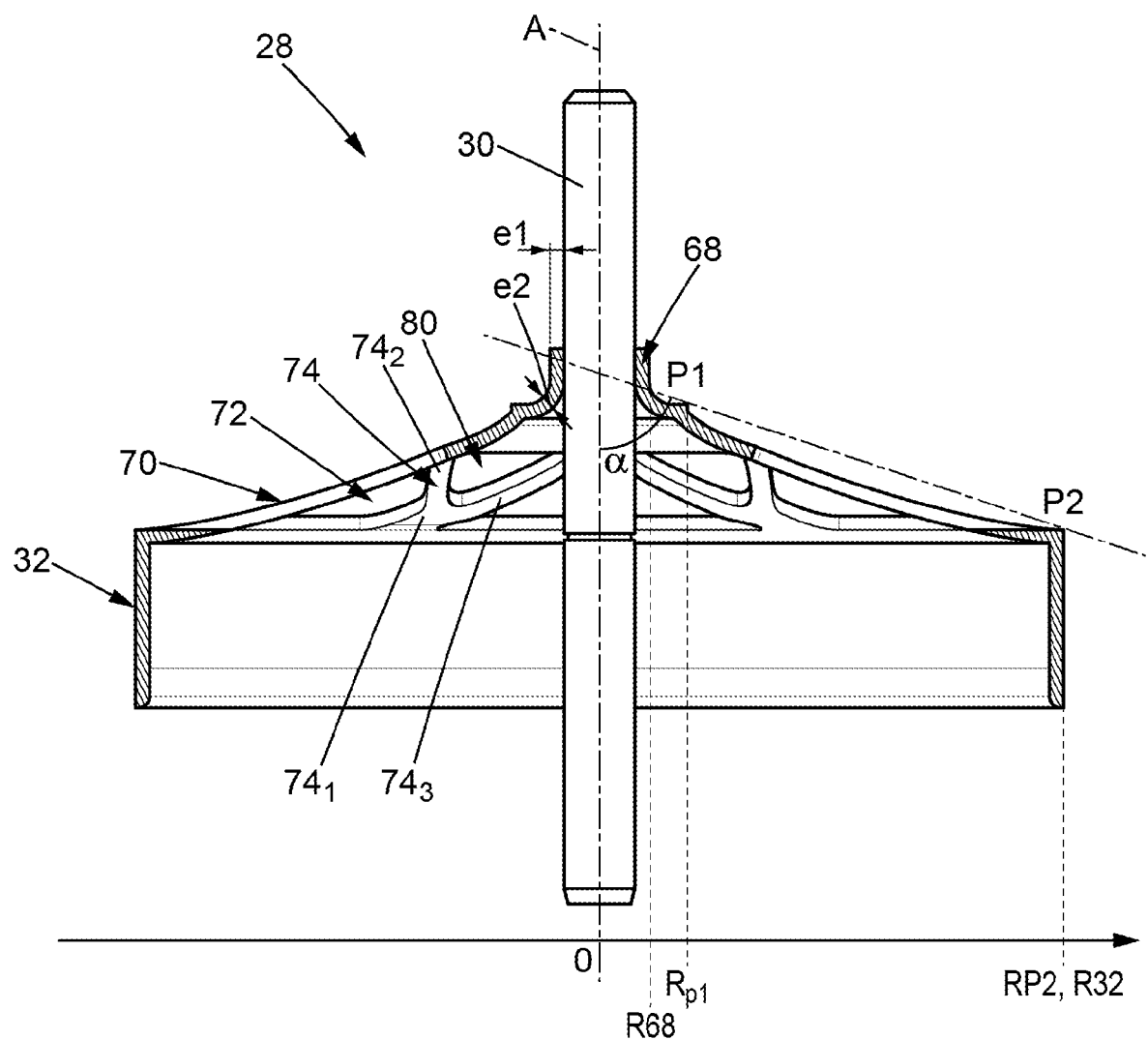
FIG. 11 is a schematic representation in section of a second example of a rotor cup able to be implemented in the motor of FIGS. 2 and 3.

FIG. 11 illustrates a second embodiment of the cup 28.

This second example of a cup comprises, preferably consists of, a first cylindrical portion 68, a second cylindrical portion 32, a third portion 70, extending between the first portion 68 and the second portion 32, and, in this instance, a bend between the first portion 68 and the third portion 70. In this instance, the third portion 70 is adjacent to the second portion 32.

Here, too, the third portion 70 is such that, as seen in cross section, the third portion 70 extends between a first, radially inner point P1 and a second, radially outer point P2, the straight line connecting the first and second points P1, P2 forming an angle α of between 65° and 80° with the axis A of symmetry of the cup 28. In this way, the third portion 70 of the cup 28 has a frustoconical overall shape, thereby helping to stiffen the cup 28. However, the angle at the center of this third portion 70 is limited so as to limit the axial bulk of the cup 28.

However, as can be seen in FIG. 11, here the third portion 70 is flared in the direction of the second cylindrical portion 32. More particularly, the third portion 70 has a concave appearance. In other words, the third portion 70 is, as seen in section, located below the straight line connecting the end points P1, P2 of the third portion 70. In other words still, the segment connecting the end points P1, P2 of the third portion 70 is not included in the cup 28.

The third portion 70 of the second example of a cup 28 of FIG. 11 has arms 74 in the form of a "Y", like those described above with reference to FIG. 10. As an alternative, however, the second example of a cup 28 may have trapezoidal arms 74, as described with reference to FIG. 8. Only the shape, as seen in section, of the arms 74 differs in the second example of a cup 28 of FIG. 11.

In this example, the cup 28 has a bend between the first portion 68 and the third portion 70. The bend may have a thickness e2, which is greater than the thickness e1 of the first portion 68. The ratio between the thickness e2 and the thickness e1 may in particular be greater than or equal to 1.3 and/or less than or equal to 1.6. A thicker bend makes it possible to strengthen the cup 28. For example, the thickness e1 is equal to 1.8 mm. The maximum thickness e2 of the bend may be equal to 2.8 mm.

The invention is not limited to the exemplary embodiments described with regard to the figures, and further embodiments will become clearly apparent to a person skilled in the art. In particular, the various examples may be combined, provided they are not contradictory.

In particular, the various examples described above may be combined.

The invention claimed is:

1. A rotor cup for a motor-fan unit intended to equip a heating, ventilation or air conditioning installation of a motor vehicle, the rotor cup exhibiting symmetry of revolution about an axis of symmetry, the rotor cup comprising:
    a first, radially inner cylindrical portion;
    a second, radially outer cylindrical portion;
    between the first cylindrical portion and the second cylindrical portion, at least a third portion such that, as seen in cross section, the third portion extends between a first, radially inner point and a second, radially outer point, a straight line connecting the first and second points forming an angle of between 65° and 80° with the axis of symmetry of the rotor cup;
    a fourth, annular portion between the first portion and the third portion, substantially normal to the axis of symmetry of the rotor cup;
    as seen in cross section, a bend between the first portion, on one side, and the third portion or the fourth portion, on the other side, a first thickness of the bend being greater than a second thickness of the first portion, the first thickness configured to form a stiffness to strengthen a structure of the rotor cup,
    the ratio between the distance between the first point and the axis of symmetry of the rotor cup and the radius of the second cylindrical portion being between 0.04 and 0.32, the ratio between the distance between the second point and the axis of symmetry of the rotor cup and the radius of the second cylindrical portion being between 0.65 and 1.0.

2. The rotor cup as claimed in claim 1, the ratio between the inner radius of the fourth portion and the radius of the second cylindrical portion being between 0.05 and 0.24 and/or the ratio between the outer radius of the fourth portion and the radius of the second cylindrical portion being between 0.15 and 0.30.

3. The rotor cup as claimed in claim 1, wherein the fourth portion forms a recess with respect to the third portion.

4. The rotor cup as claimed in claim 1, wherein the third portion is frustoconical or flared.

5. The rotor cup as claimed in claim 1, wherein the third portion has openings separated by arms, the rotor cup comprising a prime number of arms, greater than or equal to seven.

6. The rotor cup as claimed in claim 5, wherein the openings are trapezoidal or in the form of an ogive.

7. The rotor cup as claimed in claim 5, wherein the arms are in the form of a "Y".

8. The rotor cup as claimed in claim 1, made from metal, the rotor cup-having a thickness less than or equal to 2 mm.

9. The rotor cup as claimed in claim 1, the ratio between the thickness of the bend and the thickness of the first portion being greater than or equal to 1.3 and less than or equal to 1.6.

10. A motor with an outer rotor for a motor vehicle heating, ventilation or air conditioning installation, comprising a stator with a winding, a rotor comprising a rotor cup as claimed in claim 1, magnets being fixed on the second cylindrical portion of the rotor cup, the magnets being arranged radially on the outside with respect to the winding of the stator.

11. A fan for a motor vehicle heating, ventilation or air conditioning installation, comprising a motor as claimed in claim 10, a shaft secured to the rotor cup, and a fan impeller fixed to the shaft so as to be driven in rotation.

12. The rotor cup as claimed in claim 1, further comprising a fifth portion forming a recessed bend between the second cylindrical portion and the third portion, wherein the recessed bend is configured to further form the stiffness to strengthen the structure of the rotor cup.

* * * * *